US012147961B2

(12) United States Patent
Watanabe et al.

(10) Patent No.: US 12,147,961 B2
(45) Date of Patent: Nov. 19, 2024

(54) PAPER SHEET STORAGE APPARATUS, PRODUCT REGISTRATION METHOD, AND RECORDING MEDIUM

(71) Applicant: FUJITSU FRONTECH LIMITED, Inagi (JP)

(72) Inventors: Mitsuo Watanabe, Inagi (JP); Masanori Ohkawa, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 197 days.

(21) Appl. No.: 17/834,383

(22) Filed: Jun. 7, 2022

(65) Prior Publication Data

US 2022/0300940 A1    Sep. 22, 2022

Related U.S. Application Data

(63) Continuation of application No. PCT/JP2019/050218, filed on Dec. 20, 2019.

(51) Int. Cl.
*G06Q 20/20* (2012.01)
*G06K 7/14* (2006.01)
*G07G 1/00* (2006.01)

(52) U.S. Cl.
CPC ......... *G06Q 20/208* (2013.01); *G06K 7/1413* (2013.01); *G07G 1/0045* (2013.01)

(58) Field of Classification Search
CPC .. G06Q 20/208; G06K 7/1413; G07G 1/0045; G07G 1/0081; G07G 5/00
See application file for complete search history.

(56) References Cited

U.S. PATENT DOCUMENTS

| 5,914,473 | A  | * | 6/1999 | Gresky | .................. | A47F 9/046 |
|           |    |   |        |        |                    | 235/462.14 |
| 6,857,505 | B1 | * | 2/2005 | Mason  | ................. | G07G 1/0045 |
|           |    |   |        |        |                    | 186/59 |
| 8,145,531 | B1 | * | 3/2012 | Ptak   | ..................... | G06Q 20/208 |
|           |    |   |        |        |                    | 705/16 |
| 9,064,161 | B1 | * | 6/2015 | Boman  | .................. | G06V 20/40 |
| 10,266,196 | B1 | * | 4/2019 | Sinha  | ..................... | B62B 3/008 |

(Continued)

FOREIGN PATENT DOCUMENTS

JP        11219468 A    8/1999
JP     2008-040999 A    2/2008

(Continued)

OTHER PUBLICATIONS

"New Technology Catches Theft of Items Left in Shopping Carts". Retrieved from <https://www.retailitinsights.com/doc/retail-store-employees-steal-153-billion-a-ye-0001>. Originally published Jan. 15, 2009. (Year: 2009).*

(Continued)

*Primary Examiner* — Nathan A Mitchell
(74) *Attorney, Agent, or Firm* — STAAS & HALSEY LLP

(57) ABSTRACT

A paper sheet storage apparatus includes processing circuitry configured to deposit and withdraw a paper sheet under control of a POS terminal that performs an accounting process at a cash register, identify a product placed on a lower tier of a cart in a passage of the cash register, and transmit information about the product identified to the POS terminal.

6 Claims, 8 Drawing Sheets

(56) References Cited

U.S. PATENT DOCUMENTS

| | | | |
|---|---|---|---|
| 2005/0189411 A1* | 9/2005 | Ostrowski | G07G 3/00 |
| | | | 235/383 |
| 2005/0189412 A1 | 9/2005 | Hudnut et al. | |
| 2007/0084918 A1* | 4/2007 | Tabet | A47F 9/046 |
| | | | 235/383 |
| 2008/0074261 A1* | 3/2008 | Zimmerman | B62B 3/1488 |
| | | | 340/568.5 |
| 2009/0039164 A1* | 2/2009 | Herwig | G07G 1/14 |
| | | | 235/462.41 |
| 2012/0271712 A1 | 10/2012 | Katzin et al. | |
| 2013/0048732 A1* | 2/2013 | Gregerson | G06K 7/1096 |
| | | | 235/462.14 |
| 2015/0097032 A1* | 4/2015 | Olmstead | G06K 7/10861 |
| | | | 235/440 |
| 2017/0035220 A1* | 2/2017 | Leyden | A47F 9/04 |
| 2018/0225647 A1 | 8/2018 | Cordova | |
| 2018/0260612 A1* | 9/2018 | Richards | G06N 5/046 |
| 2019/0325417 A1 | 10/2019 | Sasaki | |

FOREIGN PATENT DOCUMENTS

| | | |
|---|---|---|
| JP | 2009-046166 A | 3/2009 |
| JP | 2017-102934 A | 6/2017 |
| JP | 2019-028864 A | 2/2019 |
| JP | 2019-191655 A | 10/2019 |

OTHER PUBLICATIONS

Extended European Search Report dated Nov. 28, 2022 in corresponding European Patent Application No. 19956577.1 (6 pages).
International Search Report (Form PCT/ISA/210); mailed Mar. 10, 2020 in corresponding PCT Application No. PCT/JP2019/050218; (3 pages) (2 pages English Translation).

\* cited by examiner

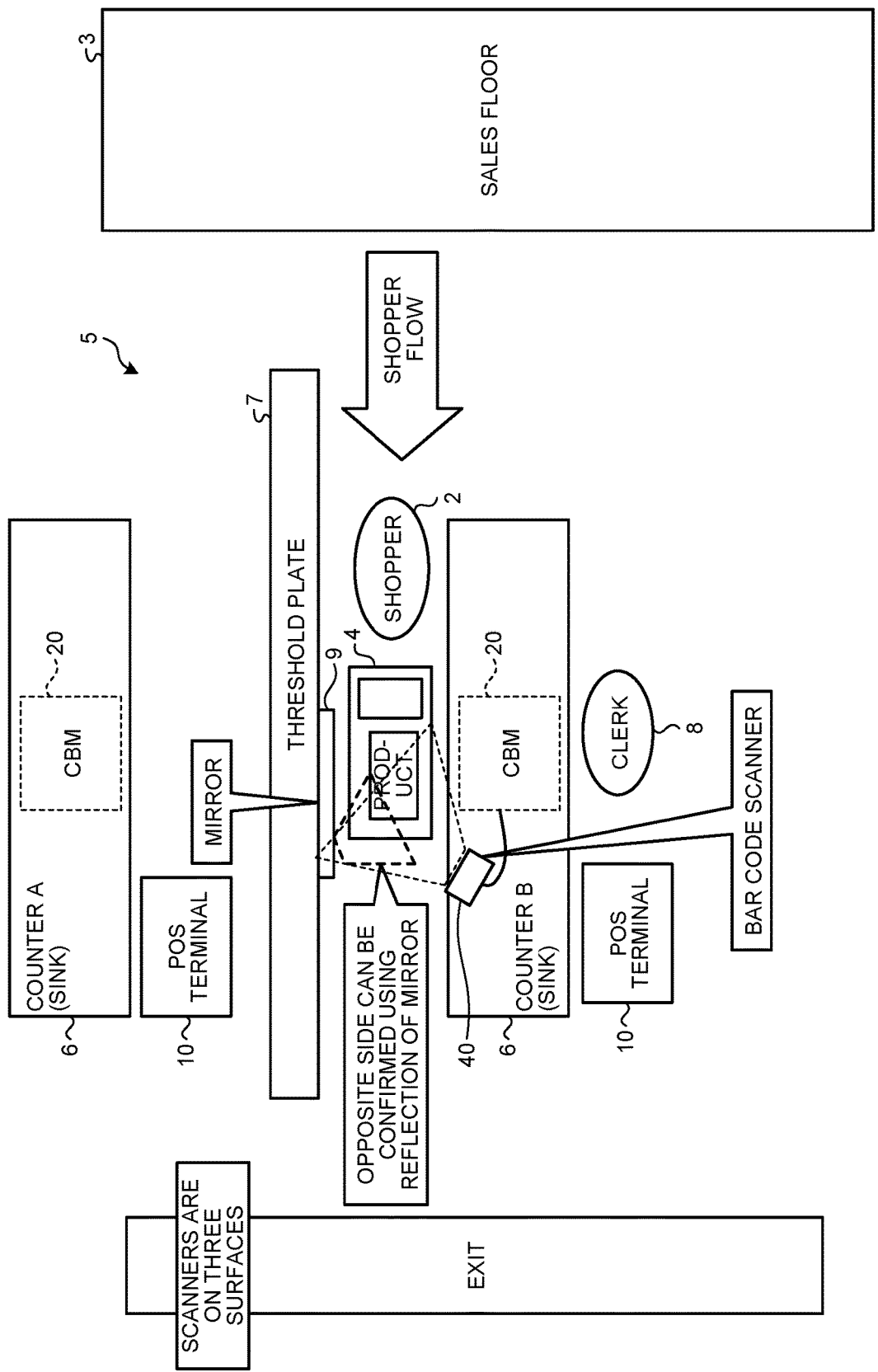

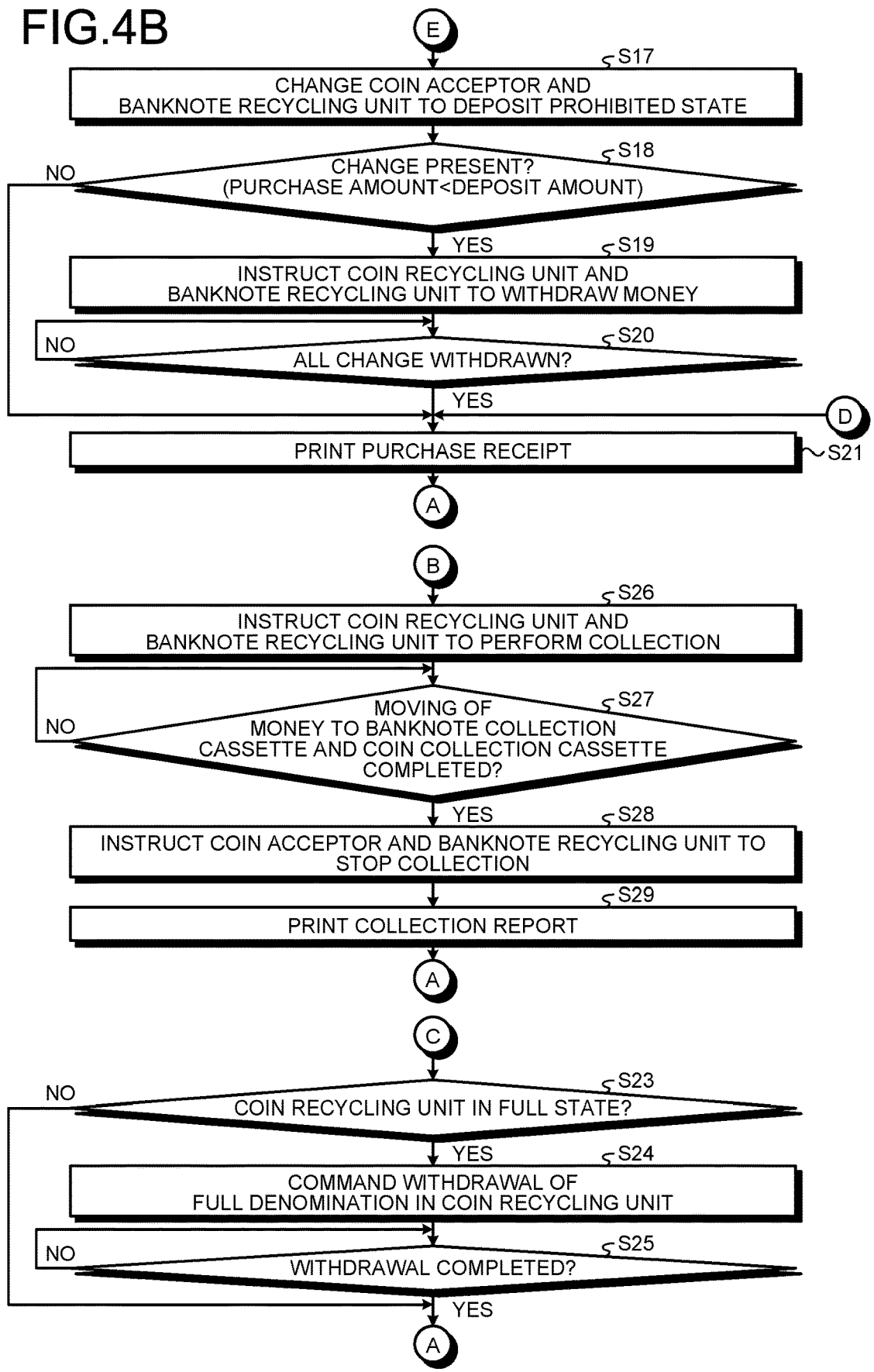

PAPER SHEET STORAGE APPARATUS, PRODUCT REGISTRATION METHOD, AND RECORDING MEDIUM

CROSS-REFERENCE TO RELATED APPLICATION

This application is a continuation application of International Application PCT/JP2019/050218, filed on Dec. 20, 2019, and designating the U.S., the entire contents of which are incorporated herein by reference.

FIELD

The present invention relates to a paper sheet storage apparatus, a product registration method, and a product registration program.

BACKGROUND

When a shopper purchases a product at a store such as a supermarket, the shopper puts the purchased product in a basket and carries the basket to a cash register. When the product to be purchased is heavy and difficult to carry in the basket, the shopper uses a cart to carry the basket. Normally, the cart has an upper tier on which the basket is placed and a lower tier on which a box filled with beer or drinking water or the like is placed. At the cash register, a clerk reads a bar code attached to the product using a bar code scanner and registers the product from a point of sale system (POS) terminal to perform a settlement process.

Note that as a related technology, there is a login control apparatus that controls login to an information terminal in a state in which an unregistered product is placed on a carrier. This login control apparatus detects a state in which the product is placed on the carrier that transports the product to be purchased. Then, this login control apparatus detects a login operation to the information terminal that moves together with the carrier. Then, in the case of detecting a state in which the product is placed on the carrier when the login operation is detected, this login control apparatus invalidates the login operation.

In addition, there is a related technology of attaching a radio frequency (RF) tag to a product and reading the RF tag using an RF antenna provided in a settlement room ward to calculate the total amount of products in the settlement room ward. In addition, there is a related technology in which a client device transmits an image of a product ID (bar code, RFID, QR code (registered trademark), etc.) associated with a product to a server, and the server identifies the product using the image of the product ID.

Patent Document 1: Japanese Laid-open Patent Publication No. 2019-191655
Patent Document 2: Japanese Laid-open Patent Publication No. 2019-28864
Patent Document 3: Japanese Laid-open Patent Publication No. 2017-102934

SUMMARY

According to an aspect of the embodiments, a paper sheet storage apparatus includes processing circuitry configured to deposit and withdraw a paper sheet under control of a POS terminal that performs an accounting process at a cash register, identify a product placed on a lower tier of a cart in a passage of the cash register, and transmit information about the product identified to the POS terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a second diagram illustrating a layout example of a cash register.
FIG. 4B is a second flowchart illustrating a processing flow by the main control application.

DESCRIPTION OF EMBODIMENTS

When scanning a bar code attached to a product using a bar code scanner, the clerk may overlook a product placed on a lower tier of the cart. In particular, when there is a paper sheet storage apparatus for storing paper sheets such as banknotes, cash vouchers, and coins between the cart and the clerk, the lower tier of the cart becomes a blind spot when viewed from the clerk. For this reason, it is conceivable that the shopper intentionally places a product on the lower tier using the blind spot.

In one aspect, the embodiments provide a paper sheet storage apparatus, product registration method, and a product registration program that can prevent omission of registration of the product placed on the lower tier of the cart.

Hereinafter, an embodiment of a paper sheet storage apparatus, a product registration method, and a product registration program disclosed in the present application will be described in detail with reference to the drawings. Note that this embodiment does not limit the disclosed technology.

Embodiment

[Layout of Cash Register]

Figure 1A:
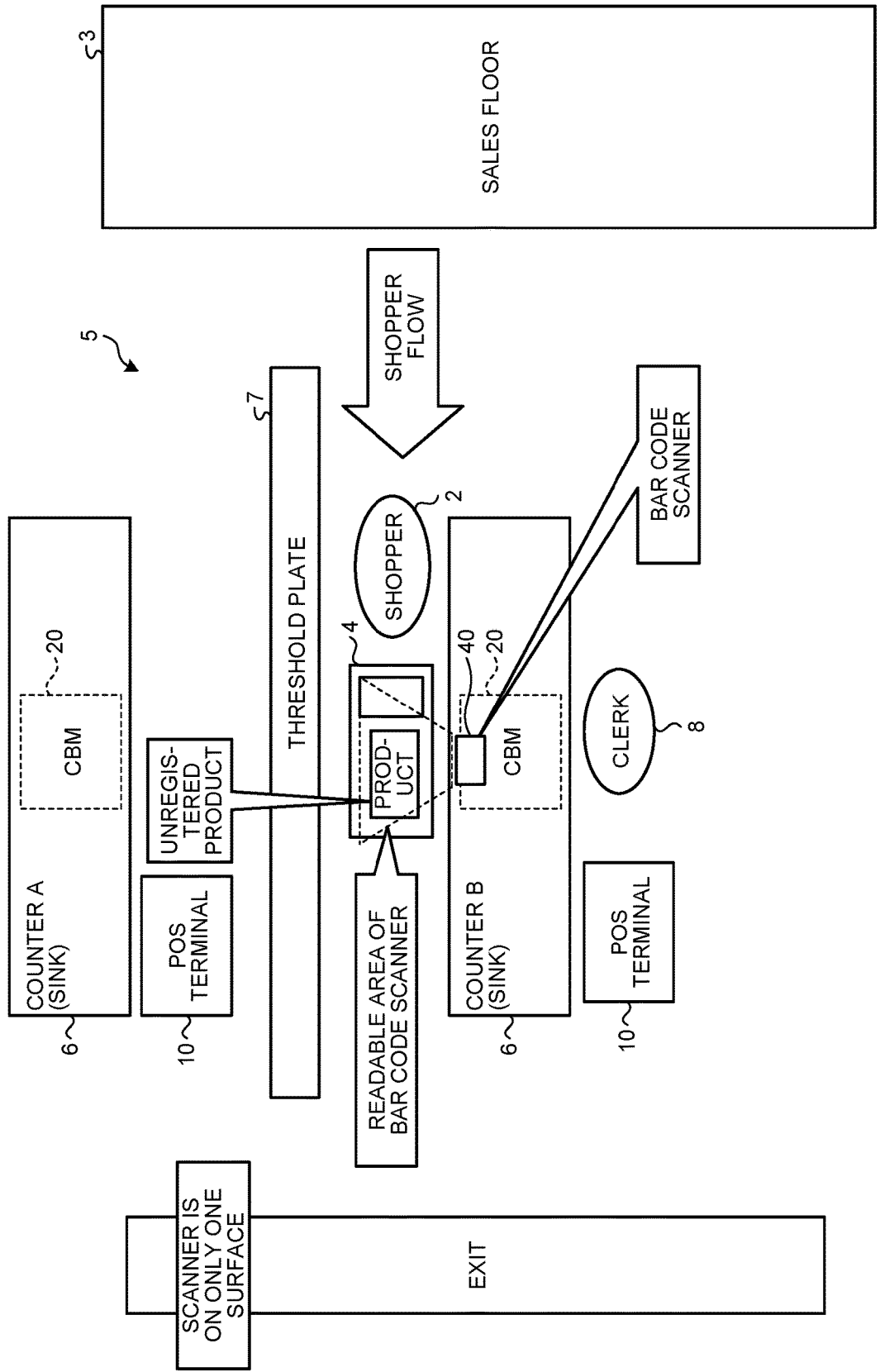
FIG. 1A is a first diagram illustrating a layout example of a cash register.

First, a layout example of a cash register will be described. FIGS. 1A and 1B are diagrams illustrating layout examples of the cash register. As illustrated in FIGS. 1A and 1B, a shopper 2 puts a product to be purchased into a basket placed on an upper tier of a cart 4 at a sales floor 3. In addition, the shopper 2 places a box, etc. filled with beer or drinking water on a lower tier of the cart 4. Then, the shopper 2 pushes the cart 4 to move to a cash register 5, passes through an aisle between a counter 6 and a threshold plate 7, and stops in front of a clerk 8.

The clerk 8 uses a bar code scanner connected to a POS terminal 10 to read a bar code attached to a product and registers the product. The POS terminal 10 calculates a total of registered products and displays a total amount on a display device. Further, in the counter 6, a cash box module (CBM) 20 for storing paper sheets such as banknotes, cash vouchers, and coins is disposed between the clerk 8 and the cart 4. A CBM 20 is placed under the counter 6. A height of the counter 6 is, for example, 90 cm. A height of the CBM 20 is, for example, 80 cm.

Figure 1C:
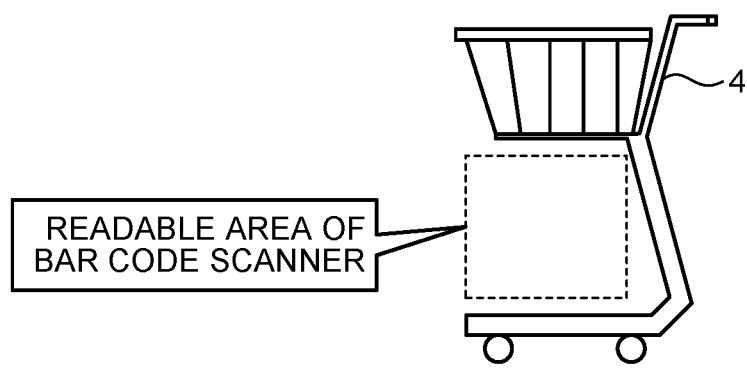
FIG. 1C is a diagram illustrating a readable area of a bar code scanner.

The CBM 20 has a bar code scanner 40 that reads a bar code attached to a product on a lower tier of the cart 4. FIG. 1C is a diagram illustrating a readable area of the bar code scanner 40. In FIG. 1C, a front side is a counter side. A surface on which the bar code scanner 40 can perform reading is a surface of the product on the counter side in FIG. 1A. Therefore, a plurality of bar codes is attached to the product so that reading can be performed no matter how the product is placed on the lower tier of the cart 4. For example, when the product is a rectangular parallelepiped, bar codes are attached to six sides. On the other hand, in FIG. 1B, the bar code scanner 40 reads bar codes on a counter side surface and a front surface of the product, and reads a bar code on a threshold plate side surface reflected by the mirror 9.

When the bar code scanner 40 scans a bar code, the bar code scanner 40 transmits the bar code to the POS terminal 10. The POS terminal 10 registers a product whose bar code is read by the bar code scanner 40 and updates the total amount. Then, the clerk 8 performs the settlement process. For example, when the clerk 8 receives cash from the shopper 2, the clerk 8 deposits the received cash in the CBM 20, and when there is change, the clerk 8 hands cash withdrawn by the CBM 20 to the shopper 2.

In this way, the bar code scanner 40 included in the CBM 20 reads the bar code of the product placed on the lower tier of the cart 4, so that the CBM 20 can prevent the clerk 8 from forgetting to read the bar code.

Note that even though the case where the cart 4 has the upper tier and the lower tier has been described, the cart 4 may have more tiers. When the cart 4 has more tiers, for example, the bar code scanner 40 reads a bar code attached to a product placed on a tier other than an uppermost tier. Further, the bar code scanner 40 may read bar codes attached to more than three surfaces of the product by utilizing reflection by another mirror.

[Configuration of CBM]

Figure 2:
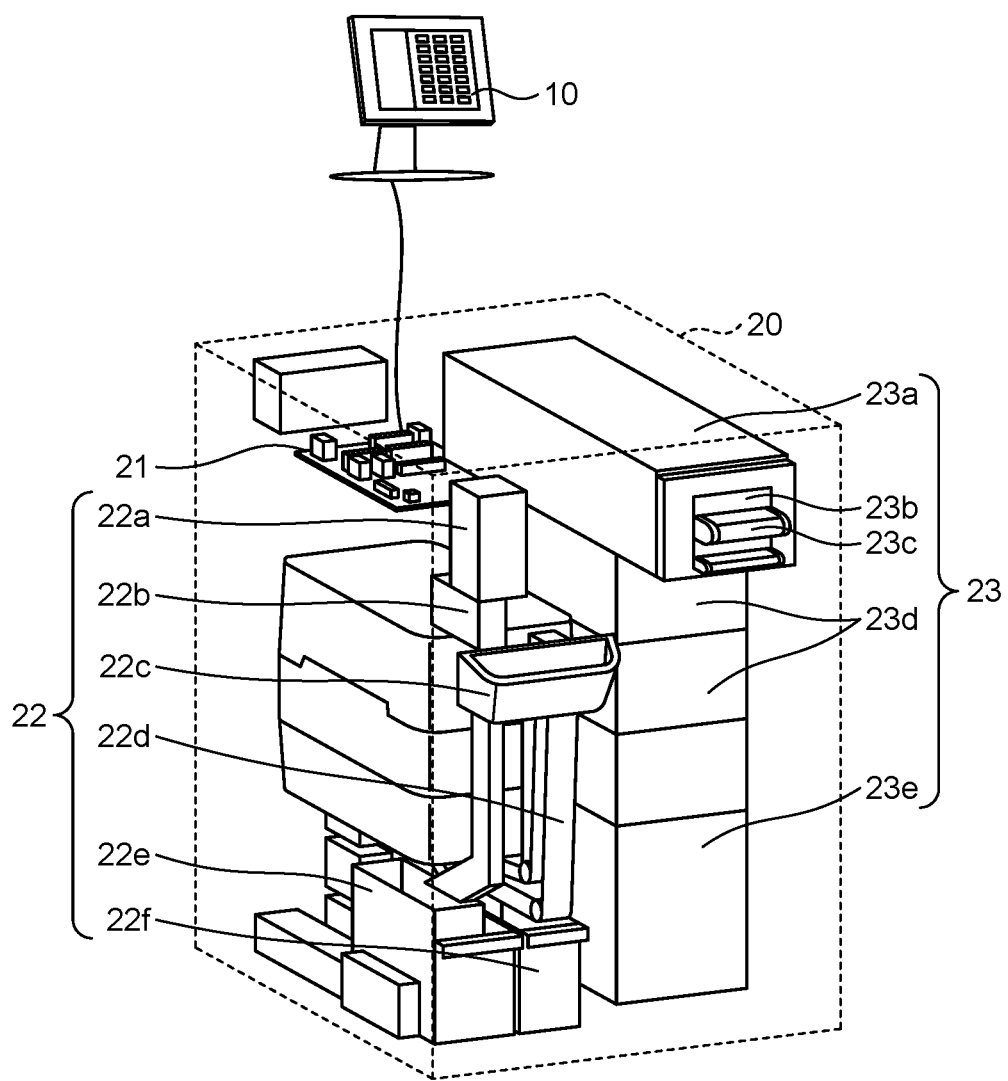
FIG. 2 is a diagram illustrating an external configuration of a CBM.
Figure 3:
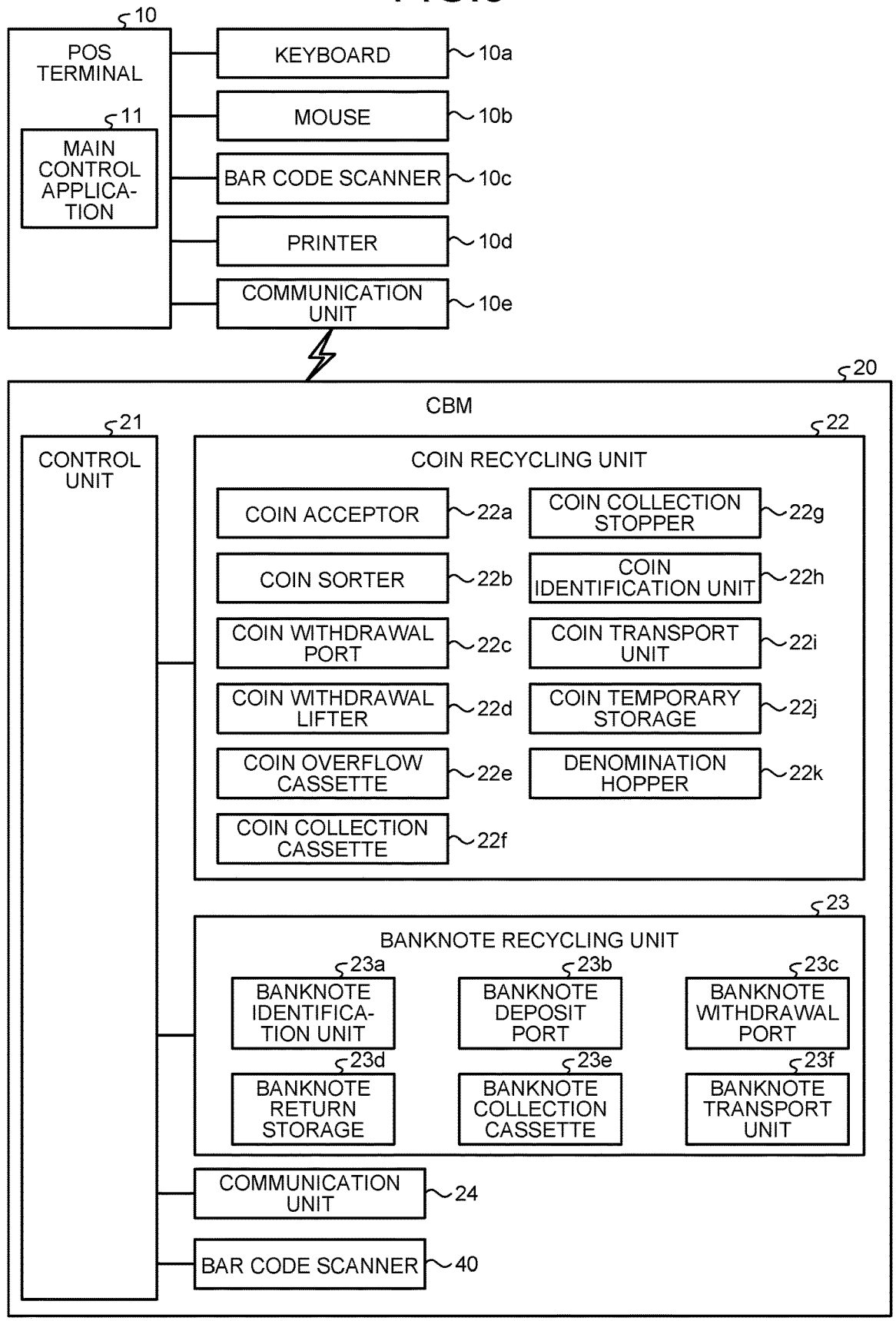
FIG. 3 is a diagram illustrating a CBM and a POS terminal.

Next, a configuration of the CBM 20 will be described. FIG. 2 is a diagram illustrating an external configuration of the CBM 20, and FIG. 3 is a diagram illustrating hardware configurations of the CBM 20 and the POS terminal 10. As illustrated in FIGS. 2 and 3, the CBM 20 includes a control unit 21, a coin recycling unit 22, a banknote recycling unit 23, a communication unit 24, and the bar code scanner 40.

The control unit 21 controls the CBM 20 based on an instruction of the POS terminal 10. The control unit 21 is connected to the coin recycling unit 22, the banknote recycling unit 23, the communication unit 24, and the bar code scanner 40.

The coin recycling unit 22 identifies and stores an inserted coin, and withdraws a coin based on an instruction of the control unit 21. The banknote recycling unit 23 identifies and stores an inserted banknote, and withdraws a banknote based on an instruction of the control unit 21. The communication unit 24 communicates with the POS terminal 10. The communication unit 24 transmits, for example, bar code information read by the bar code scanner 40 to the POS terminal 10.

The coin recycling unit 22 has a coin acceptor 22a, a coin sorter 22b, a coin withdrawal port 22c, a coin withdrawal lifter 22d, a coin overflow cassette 22e, a coin collection cassette 22f, and a coin collection stopper 22g. Further, the coin recycling unit 22 has a coin identification unit 22h, a coin transport unit 22i, a coin temporary storage 22j, and a denomination hopper 22k.

The coin acceptor 22a determines whether the inserted coin is a genuine coin or a counterfeit coin, and when the coin is genuine, the coin acceptor 22a releases the coin to the coin sorter 22b. On the other hand, in the case of counterfeit coin, the coin acceptor 22a releases the counterfeit coin to the coin withdrawal port 22c.

The coin sorter 22b releases the coin released from the coin acceptor 22a to the coin temporary storage 22j. Further, the coin sorter 22b is a passage for moving a near-full or full coin in the coin recycling unit 22 to the coin overflow cassette 22e. The coin withdrawal port 22c is an outlet for a coin withdrawn from the CBM 20. The coin withdrawal lifter 22d is a lifter for moving a coin withdrawn from the coin recycling unit 22 to the coin withdrawal port 22c.

The coin overflow cassette 22e is a coin cassette for storing a near-full or full coin in the coin recycling unit 22. The coin collection cassette 22f is a cassette that stores sales of coins stored in the CBM 20. The coin collection stopper 22g is a stopper that enables a coin stored in the coin recycling unit 22 to be transported to the coin collection cassette 22f.

The coin identification unit 22h identifies a coin in the coin temporary storage 22j. The identified coin is distributed to each denomination hopper 22k. The coin transport unit 22i transports a coin among the coin temporary storage 22j, the denomination hopper 22k, and the coin withdrawal port 22c. The coin temporary storage 22j is a storage for temporarily storing a coin released from the coin sorter 22b. The denomination hopper 22k is a storage for storing a coin. The denomination hopper 22k is in each denomination.

The banknote recycling unit 23 has a banknote identification unit 23a, a banknote deposit port 23b, a banknote withdrawal port 23c, a banknote return storage 23d, a banknote collection cassette 23e, and a banknote transport unit 23f.

The banknote identification unit 23a determines whether an inserted banknote is a genuine banknote or a counterfeit banknote. A banknote determined to be a genuine banknote is stored in the banknote return storage 23d. On the other hand, a banknote determined to be a counterfeit banknote is released from the banknote withdrawal port 23c.

The banknote deposit port 23b is an insertion port into which a banknote is inserted. The banknote withdrawal port 23c is an outlet for a banknote withdrawn from the CBM 20. The banknote return storage 23d is a storage for storing an inserted banknote for withdrawal. The banknote collection cassette 23e is a cassette that stores sales of banknotes stored in the CBM 20. The banknote transport unit 23f transports a banknote in the banknote recycling unit 23.

A keyboard 10a, a mouse 10b, a bar code scanner 10c, a printer 10d, and a communication unit 10e are connected to the POS terminal 10. The keyboard 10a is used when the clerk 8 inputs an amount of money, etc. The mouse 10b is used when the clerk 8 selects an item displayed on a screen of the POS terminal 10. The bar code scanner 10c is used when the clerk 8 reads a bar code attached to a product. The printer 10d prints and outputs a purchase receipt. The communication unit 10e communicates with the CBM 20. The communication unit 10e receives, for example, bar code information read by the bar code scanner 40 from the CBM 20 and passes the bar code information to the POS terminal 10.

On the POS terminal 10, a main control application 11 operates. The main control application 11 is a main program that controls the POS terminal 10. The main control application 11 controls the CBM 20. In the case of a collection mode, the main control application 11 instructs the coin recycling unit 22 and the banknote recycling unit 23 to perform collection. In addition, when the main control application 11 detects an abnormal state of the CBM 20, the main control application 11 performs a control operation corresponding to the abnormal state. For example, when the coin recycling unit 22 is in a full state, the main control application 11 instructs the coin recycling unit 22 to withdraw the full denomination.

In addition, the main control application 11 performs an accounting process. That is, the main control application 11 registers a product whose bar code is read by the bar code scanner 10c. In addition, the main control application 11 registers a product whose bar code is read by the bar code scanner 40. Note that when the bar code is read by the bar code scanner 40, the main control application 11 may issue an alarm instead of registering the product.

The main control application 11 calculates a purchase amount based on a price of a registered product, and performs a settlement process by a method designated by the shopper 2. For example, when the shopper 2 designates payment in cash, the main control application 11 performs a process related to money deposit, such as setting the coin acceptor 22a and the banknote recycling unit 23 to be in a receivable state. In addition, when there is change, the main control application 11 instructs the coin recycling unit 22 and the banknote recycling unit 23 to withdraw the change. Then, the main control application 11 prints the purchase receipt.

[Processing Flow by Main Control Application]

Figure 4A:
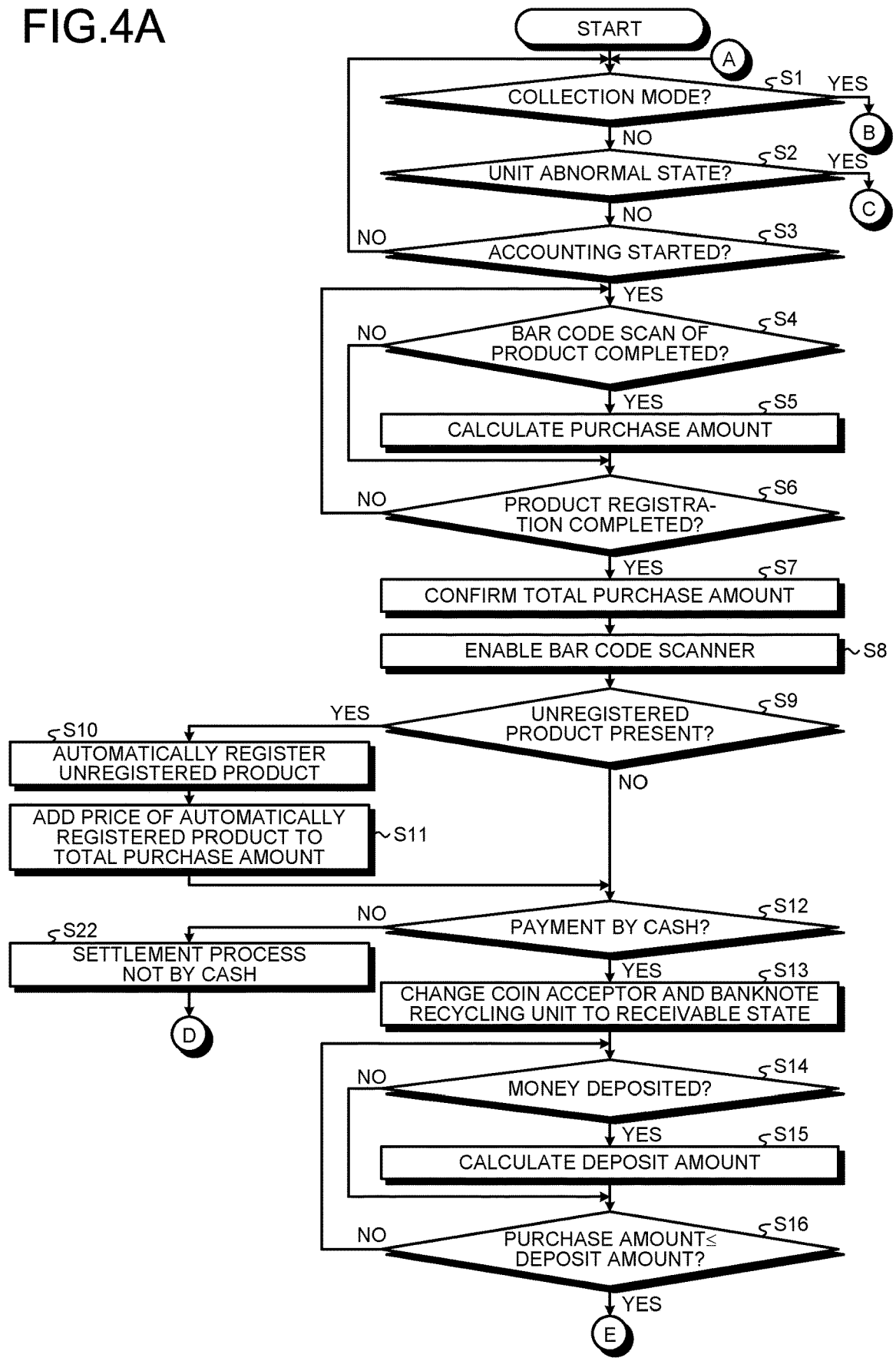
FIG. 4A is a first flowchart illustrating a processing flow by a main control application.

Next, a processing flow by the main control application 11 will be described. FIGS. 4A and 4B are flowcharts illustrating processing flows by the main control application 11. As illustrated in FIG. 4A, the main control application 11 determines whether or not a mode is a collection mode (Step S1), and determines whether or not a state is a unit abnormal state (Step S2) when the mode is not a collection mode 1 (Step S1, No). Then, when the state is not in the unit abnormal state (Step S2, No), the main control application 11 determines whether or not accounting is started (Step S3), and when the accounting is not started (Step S3, No), the process returns to Step S1.

On the other hand, when the accounting is started (Step S3, Yes), the main control application 11 determines whether or not bar code scan of a product is completed (Step S4), and when the bar code scan is not completed (Step S4, No), the process proceeds to Step S6. On the other hand, when the bar code scan is completed (Step S4, Yes), the main control application 11 calculates a purchase amount (Step S5) and determines whether or not product registration is completed (Step S6). Then, when the product registration is not completed (Step S6, No), the main control application 11 returns to Step S4.

On the other hand, when the product registration is completed (Step S6, Yes), the main control application 11 confirms a total purchase amount (Step S7) and enables the bar code scanner 40 (Step S8). Then, the main control application 11 determines whether or not there is an unregistered product based on whether or not the bar code scanner 40 scans the bar code (Step S9), and proceeds to Step S12 when there is no unregistered product (Step S9, No).

On the other hand, when there is an unregistered product (Step S9, Yes), the main control application 11 automatically registers the unregistered product (Step S10) and adds a price of the automatically registered product to the total purchase amount (Step S11).

Then, the main control application 11 determines whether or not payment is made in cash (Step S12), and changes the coin acceptor 22a and the banknote recycling unit 23 to the receivable state (Step S13) in the case of payment in cash (Step S12, Yes). Then, the main control application 11 determines whether or not there is a deposit of money (Step S14), and proceeds to Step S16 when there is no deposit (Step S14, No) and calculates a deposit amount (Step S15) when there is a deposit (Step S14, Yes).

Then, the main control application 11 determines whether or not the deposit amount is equal to or greater than the purchase amount (Step S16), and returns to Step S14 when the deposit amount is not equal to or greater than the purchase amount (Step S16, No). On the other hand, when the deposit amount is equal to or greater than the purchase amount (Step S16, Yes), the main control application 11 changes the coin acceptor 22a and the banknote recycling unit 23 to a deposit prohibited state (Step S17), and determines whether or not there is change (Step S18). Then, when there is no change (Step S18, No), the main control application 11 proceeds to Step S21.

On the other hand, when there is change (Step S18, Yes), the main control application 11 instructs the coin recycling unit 22 and the banknote recycling unit 23 to withdraw money (Step S19), and determines whether or not all the change is withdrawn (Step S20). Then, when there is change which is not withdrawn (Step S20, No), the main control application 11 returns to Step S20. On the other hand, when all the change is withdrawn (Step S20, Yes), the main control application 11 prints the purchase receipt (Step S21) and returns to Step S1.

When the payment is not made in cash in Step S12 (Step S12, No), the main control application 11 performs a settlement process not by cash (Step S22) and moves to Step S21.

In addition, when the state is the unit abnormal state in Step S2 (Step S2, Yes), the main control application 11 determines whether or not the coin recycling unit 22 is in the full state (Step S23). Then, when the coin recycling unit 22 is in the full state (Step S23, Yes), the main control application 11 commands withdrawal of the full denomination in the coin recycling unit 22 (Step S24), and determines whether or not withdrawal is completed (Step S25). Then, the main control application 11 returns to Step S1 when the withdrawal is completed (Step S25, Yes), and returns to Step S25 when the withdrawal is not completed (Step S25, No).

Further, in the case of the collection mode in Step S1 (Step S1, Yes), the main control application 11 instructs the coin recycling unit 22 and the banknote recycling unit 23 to perform collection (Step S26). Then, the main control application 11 determines whether or not moving of money to the coin collection cassette 22f and the banknote collection cassette 23e is completed (Step S27), and returns to Step S27 when the moving is not completed (Step S27, No). On the other hand, when the moving of money is completed (Step S27, Yes), the main control application 11 instructs the coin recycling unit 22 and the banknote recycling unit 23 to stop collection (Step S28), and prints a collection report (Step S29). Then, the main control application 11 returns to Step S1.

Effect of Embodiment

As described above, in the embodiment, the bar code scanner 40 of the CBM 20 reads the bar code attached to the product placed on the lower tier of the cart 4, and the communication unit 24 of the CBM 20 sends information about the bar code read by the bar code scanner 40 to the POS terminal 10. Then, in the accounting process, the main control application 11 running on the POS terminal 10 receives the bar code information transmitted from the CBM 20, registers the product corresponding to the bar code, and adds the price of the product to the purchase amount. Therefore, the CBM 20 can prevent the clerk 8 from forgetting to read the bar code. In addition, the store can inhibit a product from being dishonestly taken out by reporting a function of detecting a product placed on the lower tier of the cart 4.

Further, in the embodiment, the bar code scanner 40 may be disposed at a position for reading the bar code attached to the front of the product and the counter side of the product instead of reading the bar code attached to the counter side of the product. In this case, the mirror 9 provided on the surface of the threshold plate 7 by which the cart 4 passes may reflect the bar code attached to the threshold plate side of the product, and the bar code scanner 40 may read the bar code reflected by the mirror 9. Therefore, the bar code scanner 40 can read the bar codes attached to the three sides of the product, and can more reliably read the bar codes of the product placed on the lower tier of the cart 4. Note that the mirror 9 is not limited to a looking glass, and may be a member having the same function (for example, aluminum, stainless steel, iron, resin, etc.).

OTHER EMBODIMENTS

Note that in the embodiment, the case where the bar code attached to the product is read by the bar code scanner 40 has been described. However, the CBM 20 may photograph the bar code attached to the product using a camera and recognize the bar code from the captured image.

In addition, the CBM 20 may recognize a product package printed on a box packed with the product. In this case, the CBM 20 uses a camera instead of the bar code scanner 40 to photograph the product package. Further, the CBM 20 includes an image recognition unit, and the image recognition unit recognizes a product by comparing image data prepared in advance for the product package with an image photographed by the camera. Then, the communication unit 24 transmits a recognition result to the POS terminal 10. In this way, the CBM 20 can prevent the clerk 8 from forgetting to read the bar code by recognizing the product package using the image recognition unit.

Figure 5:
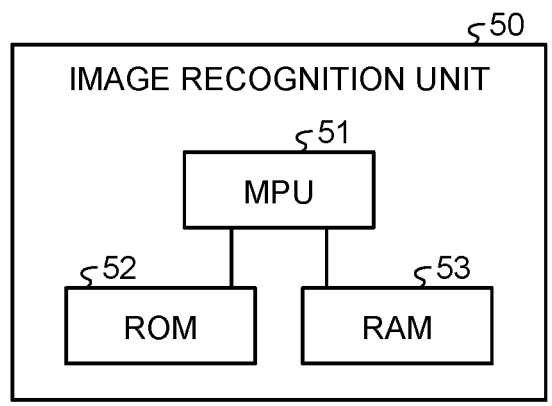
FIG. 5 is a diagram illustrating a hardware configuration of an image recognition unit.

FIG. 5 is a diagram illustrating a hardware configuration of the image recognition unit. As illustrated in FIG. 5, the image recognition unit 50 includes a micro processing unit (MPU) 51, a read only memory (ROM) 52, and a random access memory (RAM) 53.

The MPU 51 is a processing device that reads and executes an image recognition program stored in the RAM 53. The ROM 52 is a nonvolatile memory that stores image data of an image recognition program or a product package. The RAM 53 is a volatile memory that stores image data of an image recognition program or a product package read from the ROM 52. In addition, the RAM 53 stores data needed for executing the image recognition program, an intermediate result of executing the image recognition program, etc.

Further, in the embodiment, the case of handling coins and banknotes has been described. However, the CBM may handle other paper sheets such as gold tickets and service tickets.

In one aspect, the invention can prevent omission of registration of the product placed on the lower tier of the cart.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A paper sheet storage apparatus comprising:
   processing circuitry configured to:
      deposit and withdraw a paper sheet under control of a point of sale system (POS) terminal that performs an accounting process at a cash register;
      identify a product placed on a lower tier of a cart in a passage of the cash register; and
      transmit information about the product identified to the POS terminal,
   wherein
      to identify the product, a bar code scanner is configured to read a bar code attached to the product placed on the lower tier of the cart,
      the processing circuitry is further configured to read,
         a bar code of the product placed on the lower tier of the cart, the bar code attached to a paper sheet storage apparatus side of the product,
         a bar code of the product attached to a front side of the product, and
         a bar code of the product attached to an opposite side of the product from the paper sheet storage apparatus side of the product, the bar code being reflected by a mirror disposed at a position allowing the bar code to be read,
         the mirror disposed on a surface of a threshold plate by which the cart passes to reflect the bar code attached to a threshold plate side of the product for the bar code scanner to read the bar code reflected by the mirror.

2. The paper sheet storage apparatus according to claim 1, wherein the processing circuitry is further configured to:
   photograph a bar code attached to the product placed on the lower tier of the cart, and
   identify the product based on the bar code photographed.

3. The paper sheet storage apparatus according to claim 1, wherein the processing circuitry is further configured to:
   photograph a product package printed on the product placed on the lower tier of the cart, and
   identify the product based on the product package photographed.

4. The paper sheet storage apparatus according to claim 2, wherein the processing circuitry is further configured to photograph an image of the product placed on the lower tier of the cart from a paper sheet storage apparatus side of the product, an image of the product from a front side of the cart, and an image of the product from an opposite side from the paper sheet storage apparatus, the image from the opposite side being reflected by the mirror disposed at a position allowing the image to be photographed.

5. A product registration method comprising:
depositing and withdrawing a paper sheet under control of a point of sale system (POS) terminal that performs an accounting process at a cash register;
identifying a product placed on a lower tier of a cart in a passage of the cash register, by processing circuitry; and
transmitting information about the product to the POS terminal,
wherein
the identifying includes reading, by a bar code scanner,
a bar code of the product placed on the lower tier of the cart, the bar code attached to a paper sheet storage apparatus side of the product,
a bar code of the product attached to a front side of the product, and
a bar code of the product attached to an opposite side of the product from the paper sheet storage apparatus side of the product, the bar code being reflected by a mirror disposed at a position allowing the bar code to be read,
the mirror disposed on a surface of a threshold plate by which the cart passes to reflect the bar code attached to a threshold plate side of the product for the bar code scanner to read the bar code reflected by the mirror.

6. A non-transitory computer-readable recording medium storing therein a product registration program that causes a computer to execute a process comprising:
depositing and withdrawing a paper sheet under control of a point of sale system (POS) terminal that performs an accounting process at a cash register;
identifying a product placed on a lower tier of a cart in a passage of the cash register; and
transmitting information about the product to the POS terminal,
wherein
the identifying includes, by a bar code scanner, reading
a bar code of the product placed on the lower tier of the cart, the bar code attached to a paper sheet storage apparatus side of the product,
a bar code of the product attached to a front side of the product, and
a bar code of the product attached to an opposite side of the product from the paper sheet storage apparatus side of the product, the bar code being reflected by a mirror disposed at a position allowing the bar code to be read,
the mirror disposed on a surface of a threshold plate by which the cart passes to reflect the bar code attached to a threshold plate side of the product for the bar code scanner to read the bar code reflected by the mirror.

* * * * *